(12) United States Patent
Lesieur et al.

(10) Patent No.: US 6,726,836 B1
(45) Date of Patent: Apr. 27, 2004

(54) METHOD FOR DESULFURIZING GASOLINE OR DIESEL FUEL FOR USE IN A FUEL CELL POWER PLANT

(75) Inventors: Roger R. Lesieur, Enfield, CT (US); Brian A. Cocolicchio, Danbury, CT (US); Antonio M. Vincitore, Manchester, CT (US)

(73) Assignee: UTC Fuel Cells, LLC, So. Windsor, CT (US)

( * ) Notice: Subject to any disclaimer, the term of this patent is extended or adjusted under 35 U.S.C. 154(b) by 606 days.

(21) Appl. No.: 09/653,858

(22) Filed: Sep. 1, 2000

(51) Int. Cl.[7] .............................................. C10G 45/00
(52) U.S. Cl. ........................ 208/217; 208/244; 208/89; 208/143; 208/208 R; 208/209
(58) Field of Search ................................. 208/244, 217, 208/89, 143, 208 R, 209

(56) References Cited

U.S. PATENT DOCUMENTS

| | | | |
|---|---|---|---|
| 3,485,746 A | * 12/1969 | Setzer et al. | 208/244 |
| 3,899,543 A | 8/1975 | Cosyns et al. | 260/667 |
| 3,997,430 A | 12/1976 | Christman et al. | 208/211 |
| 4,181,503 A | 1/1980 | Lesieur et al. | 48/196 |
| 5,686,196 A | 11/1997 | Singh et al. | 429/17 |

OTHER PUBLICATIONS

George A. Olah, Hydrocarbon Chemistry, 1995.*

* cited by examiner

Primary Examiner—Walter D. Griffin
Assistant Examiner—James Arnold, Jr.
(74) Attorney, Agent, or Firm—William W. Jones

(57) ABSTRACT

A fuel processing method is operable to remove substantially all of the sulfur present in an undiluted hydrocarbon fuel stock supply which is used to power a fuel cell power plant in a mobile environment, such as an automobile, bus, truck, boat, or the like; or in a stationary environment. The power plant hydrogen fuel source can be gasoline, diesel fuel, or other like fuels which contain relatively high levels of organic sulfur compounds such as mercaptans, sulfides, disulfides, thiophenes and the like. The undiluted hydrocarbon fuel supply is passed through a nickel reactant desulfurizer bed wherein essentially all of the sulfur in the organic sulfur compounds reacts with the nickel reactant, and is converted to nickel sulfide, while the now desulfurized hydrocarbon fuel supply continues through the remainder of the fuel processing system. The method involves adding hydrogen to the fuel stream prior to the desulfurizing step. The method can be used to desulfurize either a liquid or a gaseous fuel stream. The addition of hydrogen serves to extend the useful life of the nickel reactant. The hydrogen can be derived from source of pure hydrogen gas, a recycle gas stream, or can be derived from an electrolysis cell which breaks down water produced in the fuel cell into its hydrogen and oxygen components. The hydrogen when added to the fuel stock serves to prevent or minimize carbon formation on the nickel reactant bed, thereby extending the useful life of the reactant bed, since carbon deposits tend to block active sites in the reactant bed.

5 Claims, 3 Drawing Sheets

METHOD FOR DESULFURIZING GASOLINE OR DIESEL FUEL FOR USE IN A FUEL CELL POWER PLANT

TECHNICAL FIELD

The present invention relates to a method for desulfurizing gasoline, diesel fuel or like hydrocarbon fuel streams so as to render the fuel more suitable for use in a mobile vehicular fuel cell power plant assembly. More particularly, the desulfurizing method of this invention is operable to remove organic sulfur compounds found in gasoline to levels which will not poison the catalysts in the fuel processing section of the fuel cell power plant assembly. The method of this invention involves the use of a nickel reactant bed which has an extended useful life cycle due to the addition of hydrogen to the fuel stream in appropriate amounts.

BACKGROUND OF THE INVENTION

Gasoline, diesel fuel, and similar hydrocarbon fuels have not been useful as a process fuel source suitable for conversion to a hydrogen rich stream for small mobile fuel cell power plants due to the existence of relatively high levels of naturally-occurring complex organic sulfur compounds. Hydrogen generation in the presence of sulfur results in a poisoning effect on all of the catalysts used in the hydrogen generation system in a fuel cell power plant. Conventional fuel processing systems used with stationary fuel cell power plants include a thermal steam reformer, such as that described in U.S. Pat. No. 5,516,344. In such a fuel processing system, sulfur is removed by conventional hydrodesulfurization techniques which typically rely on a certain level of recycle as a source of hydrogen for the process. The recycle hydrogen combines with the organic sulfur compounds to form hydrogen sulfide within a catalytic bed. The hydrogen sulfide is then removed using a zinc oxide bed to form zinc sulfide. The general hydrodesulfurization process is disclosed in detail in U.S. Pat. No. 5,292,428. While this system is effective for use in large stationary applications, it does not readily lend itself to mobile transportation applications because of system size, cost and complexity. Not only is the hydrodesulfurization process more complicated because it is a two step process, but to be effective in desulfurizing heavier fuels containing thiophenic sulfur compounds, it must operate at elevated pressures, usually greater than about 150 psig.

Other fuel processing systems, such as a conventional autothermal reformer, which use a higher operating temperature than conventional thermal steam reformers, can produce a hydrogen-rich gas in the presence of the foresaid complex organic sulfur compounds without prior desulfurization. When using an autothermal reformer to process raw fuels which contain complex organic sulfur compounds, the result is a loss of autothermal reformer catalyst effectiveness and the requirement of reformer temperatures that are 200° F.–500° F. higher than are required with a fuel having less than 0.05 ppm sulfur. Additionally, a decrease in useful catalyst life of the remainder of the fuel processing system occurs with the higher sulfur content fuels. The organic sulfur compounds are converted to hydrogen sulfide as part of the reforming process. The hydrogen sulfide can then be removed using a solid absorbent scrubber, such as an iron or zinc oxide bed to form iron or zinc sulfide. The aforesaid solid scrubber systems are limited, due to thermodynamic considerations, as to their ability to lower sulfur concentrations to non-catalyst degrading levels in the fuel processing components which are located downstream of the reformer, such as in the shift converter, or the like.

Alternatively, the hydrogen sulfide can be removed from the gas stream by passing the gas stream through a liquid scrubber, such as sodium hydroxide, potassium hydroxide, or amines. Liquid scrubbers are large and heavy, and are therefore useful principally only in stationary fuel cell power plants. From the aforesaid, it is apparent that current methods for dealing with the presence of complex organic sulfur compounds in a raw fuel stream for use in a fuel cell power plant require increasing fuel processing system complexity, volume and weight, and are therefore not suitable for use in mobile transportation systems.

An article published in connection with the 21st Annual Power Sources Conference proceedings of May 16–18, 1967, pages 21–26, entitled "Sulfur Removal for Hydrocarbon-Air Systems", and authored by H. J. Setzer et al, relates to the use of fuel cell power plants for a wide variety of military applications. The article describes the use of high nickel content hydrogenation nickel reactant to remove sulfur from a military fuel called JP-4, which is a jet engine fuel, and is similar to kerosene, so as to render the fuel useful as a hydrogen source for a fuel cell power plant. The systems described in the article operate at relatively high temperatures in the range of 600° F. to 700° F. The article also indicates that the system tested was unable to desulfurize the raw fuel alone, without the addition of water or hydrogen, due to reactor carbon plugging. The carbon plugging occurred because the tendency for carbon formation greatly increases in the temperature range between about 550° F. and about 750° F. A system operating in the 600° F. to 700° F. range would be very susceptible to carbon plugging, as was found to be the case in the system described in the article. The addition of either hydrogen or steam reduces the carbon formation tendency by supporting the formation of gaseous carbon compounds thereby limiting carbon deposits which cause the plugging problem.

Commonly owned co-pending U.S. patent application Ser. No. 09/470,483, filed Dec. 22, 1999 describes a system and method for desulfurizing gasoline and/or diesel fuel by passing the fuel through a nickel reactant bed wherein a major portion of the sulfur in the fuel is converted to nickel sulfide. The fuel stream contains an oxygenate such as ethanol, methanol or MTBE which acts to extend the useful like of the nickel reactant bed by suppressing carbon formation on the reactant bed. The use of such oxygenates has been found to increase the capacity of the nickel reactant bed to convert sulfur in organic sulfur compounds in the fuel to nickel sulfide by about five hundred percent. The operating conditions of the system and method described in the above-noted patent application are suitable for use in mobile applications of fuel cell power plants, such as those usable in powering vehicles. One problem incurred by using MTBE is that the MTBE itself decomposes to an unsaturated hydrocarbon so it adds to the total potential carbon deposited onto the nickel. Carbon formation tends to poison the reactant by blocking pores and active sites of the nickel reactant.

It would be highly desirable from an environmental standpoint to be able to power electrically driven vehicles, such as an automobile, for example, by means of fuel cell-generated electricity; and to be able to use a fuel such as gasoline, diesel fuel, naphtha, lighter hydrocarbon fuels such as butane, propane, natural gas, or like fuel stocks, as the fuel consumed by the vehicular fuel cell power plant in the production of electricity. In order to provide such a vehicular power source, the amount of sulfur in the processed fuel gas would have to be reduced to and maintained at less than about 0.05 parts per million.

The desulfurized processed fuel stream can be used to power a fuel cell power plant in a mobile environment or as a fuel for an internal combustion engine. The fuel being processed can be gasoline or diesel fuel, or some other fuel which contains relatively high levels of organic sulfur compounds such as thiophenes, mercaptans, sulfides, disulfides, and the like. The fuel stream is passed through a nickel desulfurizer bed wherein essentially all of the sulfur in the organic sulfur compounds reacts with the nickel reactant and is converted to nickel sulfide leaving a desulfurized hydrocarbon fuel stream which continues through the remainder of the fuel processing system. Previously filed U.S. patent applications Ser. No. 09/104,254, filed Jun. 24, 1998; and Ser. No. 09/221,429, filed Dec. 28, 1998 describe systems for use in desulfurizing a gasoline or diesel fuel stream for use in a mobile fuel cell vehicular power plant; and in an internal combustion engine, respectively.

We have discovered that the capacity of a nickel reactant bed for desulfurizing a gasoline or diesel fuel stream can be extended through the addition of hydrogen to the fuel stream in appropriate proportions without the need to include oxygenates in the fuel stream. The addition of hydrogen to the fuel stream essentially doubles the useful life of the nickel reactant bed over and above the procedure which utilizes the inclusion of oxygenates in the fuel stream.

DISCLOSURE OF THE INVENTION

This invention relates to an improved method for processing a gasoline, diesel, or other hydrocarbon fuel stream over an extended period of time, which method is operable to remove substantially all of the sulfur present in the fuel stream.

Gasoline, for example, is a hydrocarbon mixture of paraffins, napthenes, olefins and aromatics, whose olefinic content is between 1% and 15%, and aromatics between 20% and 40%, with total sulfur in the range of about 20 ppm to about 1,000 ppm. The national average for the United States is 350 ppm sulfur. The legally mandated average for the State of California is 30 ppm sulfur. As used in this application, the phrase "California Certified Gasoline" refers to a gasoline which has between 30 and 40 ppm sulfur content. California Certified Gasoline is used by new car manufacturers to establish compliance with California emissions certification requirements.

We have discovered that the addition of hydrogen ($H_2$) to the gasoline or diesel fuel stream extends the effective life of the nickel reactant sulfur-adsorption bed. The added hydrogen supresses carbon deposition on the nickel reactant bed, which carbon deposition would otherwise occupy and cover active sulfur-adsorption sites in the nickel bed, and could thereby shorten the effective life of the nickel reactant bed.

The effectiveness of a nickel adsorbent reactant to strip sulfur from organic sulfur compounds contained in gasoline or diesel fuel depends on the maintenance of as many active sulfur-adsorption sites in the reactant bed for the longest possible time. In other words, the desulfurization process depends on the amount of competitive adsorption sites of the various sulfur-containing constituents of gasoline or diesel fuel. From the adsorption theory, it is known that the relative amount of adsorbate on an adsorbent surface depends primarily on the adsorption strength produced by attractive forces between the adsorbate and adsorbent molecules; secondarily on the concentration of the adsorbate in the gasoline, and temperature. Coverage of a reactant surface by an adsorbate increases with increasing attractive forces; higher fuel concentration; and lower temperatures. Relative to gasoline, Somorjai (*Introduction to Surface Chemistry and Catalysis*, pp, 60–74) provides some relevant information on the adsorption of hydrocarbons on transition metal surfaces, such as nickel. Saturated hydrocarbons only physically adsorb onto the nickel reactant surface at temperatures which are less than 100° F., therefore paraffins, and most likely naphthenes, won't compete with sulfur compounds for adsorption sites on the nickel reactant at temperatures above 250° F. and 300° F.

On the other hand, unsaturated hydrocarbons, such as aromatics and olefins, adsorb largely irreversibly on transition metal surfaces even at room temperature. When an unsaturated hydrocarbon such as an aromatic or an olefin adsorbs on a transition metal surface, and the surface is heated, the adsorbed molecule rather than desorbing intact, decomposes to evolve hydrogen, leaving the surface covered by the partially dehydrogenated fragment, i.,e., tar or coke precursors. We have discovered that, at 350° F., some unsaturated hydrocabons are dehydrogenated, and the dehydrogenated tar fragments form multiple carbon atom-to-nickel reactant surface bonds. This explains why aromatics and olefins in gasoline or diesel fuel, in the absence of $H_2$ in appropriate concentrations, will deactivate the nickel reactant from adsorbing sulfur after a relatively short period of time.

In general, the adsorption strength of a compound depends on the dipole moment, or polarity, of the molecule. A higher dipole moment indicates that the compound is more polar and is more likely to adsorb on a reactant surface. Aromatics are an exception to this rule because their molecular structure includes a π ring of electron forces that produces a cloud of induced attractive forces with adjacent surfaces. Based on the dipole moments of hydrocarbons, allowing for the π ring in aromatics, the order of adsorption strength (highest to lowest) is: nitrogenated hydrocarbons>oxygenated hydrocarbons>aromatics>olefins>hydrocarbons containing sulfur>saturated hydrocarbons. The presence of hydrogen in the gasoline or diesel fuel being scrubbed results in hydrogenation of the dehydrogenated byproducts of the desulfurized organic compounds which are adsorbed onto the reactant surface, which frees the byproducts from the nickel reactant adsorption sites. Thus, hydrogenation can reduce the adsorption of desulfurized aromatic and olefin byproducts on the nickel reactant bed. Although saturated hydrocarbons (paraffins and cycloparaffins) would not be expected to be adsorbed on the desulfurization nickel reactant to a significant extent, hydrogenation of olefins and aromatics will also prevent them from adsorbing onto the nickel reactant.

We have also discovered that the hydrogenated hydrocarbons do not inhibit the sulfur compounds from being adsorbed on the nickel reactant because they do not adsorb onto the nickel reactant surface at temperatures in the range of about 200° F. to about 500° F. The sulfur compounds are quite polar and therefore contact and react with the active nickel metal reactant sites.

Further non-essential but enabling information relating to this invention will become readily apparent to one skilled in the art from the following detailed description of a preferred embodiment of the invention when taken in conjunction with the accompanying drawings in which:

SPECIFIC MODES FOR CARRYING OUT THE INVENTION

Figure 1:
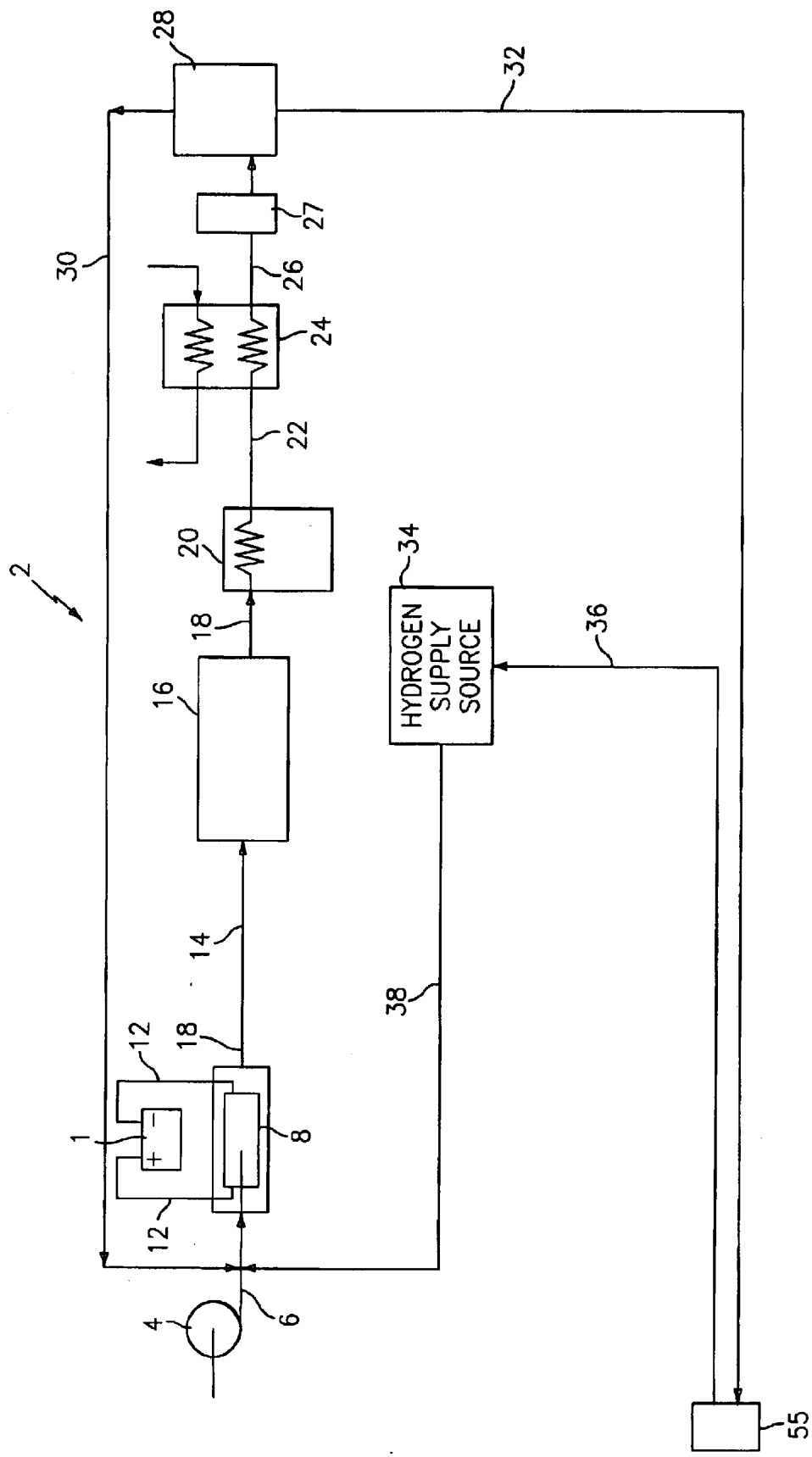
FIG. 1 is a schematic drawing of a system which is formed in accordance with this invention for desulfurizing a gasoline or diesel fuel stream so that the latter may serve as a source of hydrogen for powering an fuel cell power plant used to supply energy for operating a vehicle.

Referring now to the drawings, FIG. 1 is a schematic view of a desulfurizing system which can be used onboard a vehicle to provide hydrogen to a fuel cell power plant that is used to produce electricity to operate the vehicle. The fuel being desulfurized can be gasoline or diesel fuel, or some other fuel which is normally available to operate an internal combustion engine. It will be noted that all of the components of the system are disposed onboard the vehicle in question. The system is denoted generally by the numeral 2 and includes a fuel supply tank 4 and a line 6 which leads from the fuel tank 4 to a nickel reactant desulfurizer bed 8. The desulfurizer bed 8 may be heated to operating temperatures by a battery 1 connected to the desulfurizer bed 8 by cables 12. The desulfurizer bed 8 will preferably be run at temperatures which will vaporize the fuel stream entering the desulfurizer bed 8. The desulfurized fuel passes through a line 14 to a reformer 16, which is preferably an autothermal reformer. The hydrogen-enriched reformed fuel passes through a line 18, through a first heat exchanger 20 and thence through a line 22 into a second heat exchanger 24. The heat exchangers 20 and 24 serve to lower the temperature of the reformed fuel stream while raising the temperature of the fuel, steam and air entering the reformer. The reformed fuel stream then passes through a line 26 and thence through a water gas shift converter 27 before it enters a selective oxidizer 28 where CO in the fuel stream is oxidized to $CO_2$, before the $H_2$ enriched gas stream is fed to the fuel cell anode. The treated fuel stream exits the selective oxidizer 28 via line 32 and ultimately enters the fuel cell power plant 55. A hydrogen recycle line 30 connects the selective oxidizer 28 and the line 6 so that a controlled amount of hydrogen can be removed from the selective oxidizer 28 and recycled back into the fuel stream in the line 6. The hydrogen recycle line 30 could also be connected to the desulfurizer bed 8 if so desired. The purpose of the recycle line 30 is to add a controlled amount of hydrogen ($H_2$) to the fuel stream as it enters the desulfurizer bed 8. The amount of hydrogen fed into the bed 8 can be controlled by means of a pump or an ejector (not shown). An ejector is a device which is used to draw a secondary fluid into a primary fluid stream with no moving parts, such as a Venturi tube assembly.

The $H_2$ additive can also be derived from a source of $H_2$ 34 that can take the form of a hydrogen tank; a hydride bed; or an electrolysis cell which breaks down water from the fuel cell 55, or from some other source, into $H_2$ and $O_2$. When water from the fuel cell is used, the water will be delivered to the $H_2$ source 34 by means of a line 36. $H_2$ from the $H_2$ source 34 is delivered to the line 6 via a line 38. As noted above, the addition of $H_2$ to the fuel stream results in hydrogenation of adsorbed unsaturated hydrocarbons which will then desorb from the nickel reactant so as not to inhibit the sulfur compounds from being adsorbed on the nickel reactant.

Figure 2:
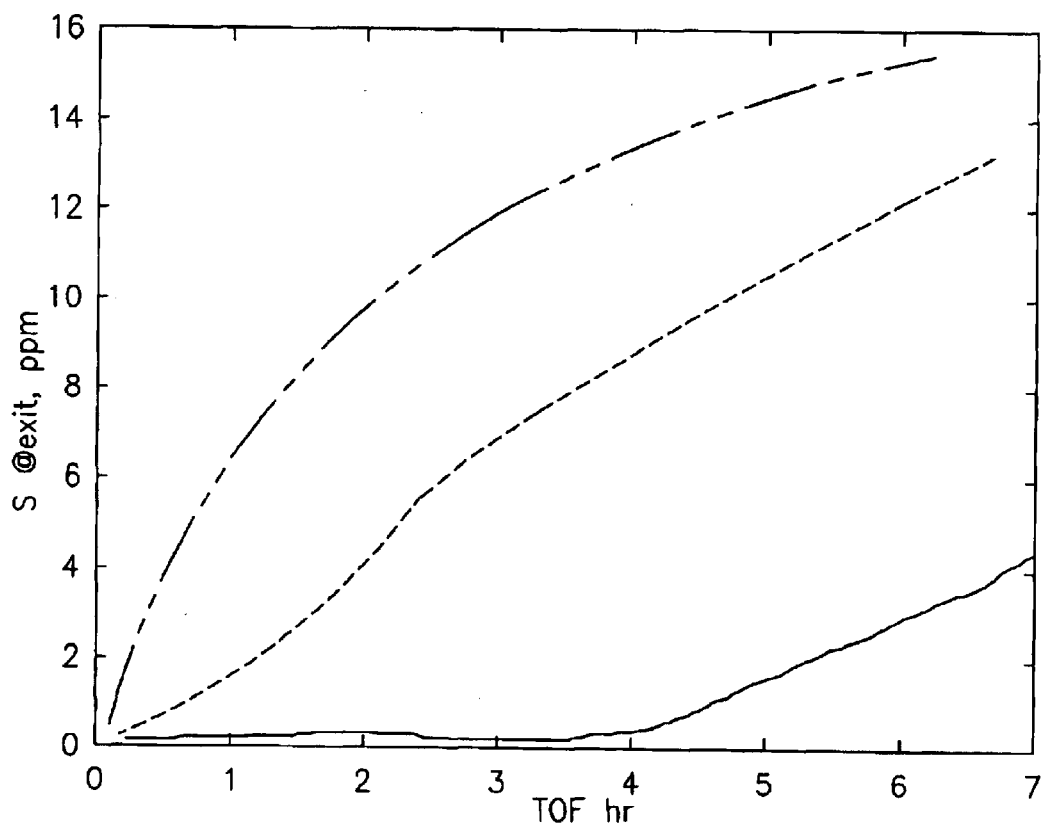
FIG. 2 is a graph showing sulfur exit levels versus total operation time comparing recycle hydrogen from the selective oxidizer with an MTBE additive but no hydrogen additive; and with neither MTBE nor hydrogen additive.

FIG. 2 is a graph of the results of short term desulfurizer test runs which compares the effectiveness of hydrogen and MTBE as desulfurizing gasoline with an gasoline which had no additives at all. It will be noted that the hydrogen additive resulted in a lower desulfurizer exit stream sulfur level for a longer time than the MTBE, and for a much longer time than when no additive was added to the gasoline. In the samples used in this test run, the additive-free gasoline and the hydrogen additive samples contained twenty one ppm sulfur at the desulfurizer inlet, and the sample to which MTBE was added contained twenty five ppm sulfur at the desulfurizer inlet. The amount of MTBE in the gasoline was 11% by weight, and the amount of hydrogen added to the gasoline was 160 ml/min, which is equivalent to about 0.7% of the hydrogen exiting from the selective oxidizer. The temperature was 350° F. and the space velocity was twenty six pounds of fuel per hour per pound of reactant.

Figure 3:
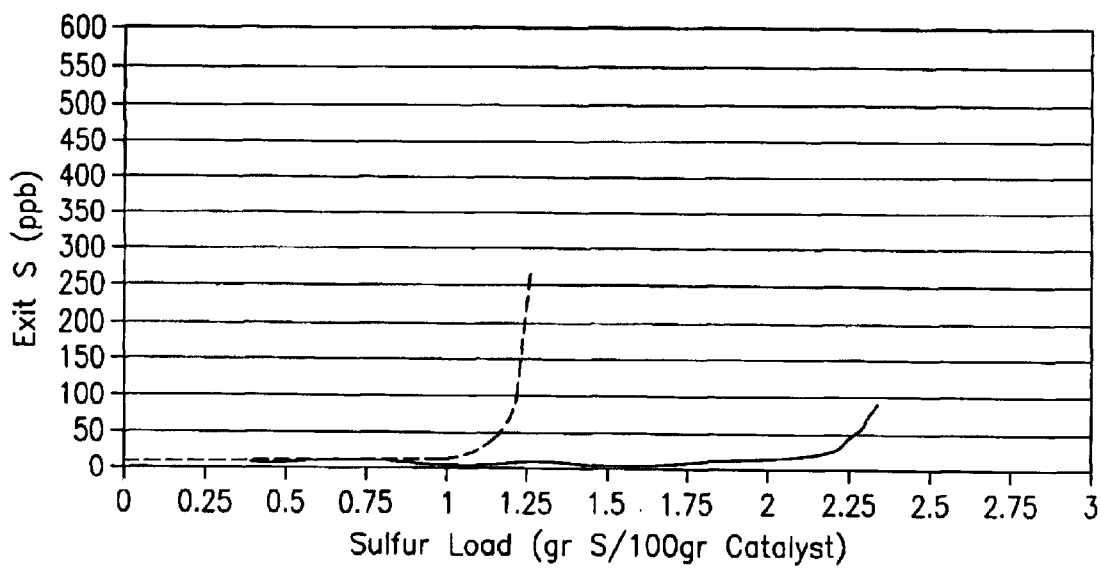
FIG. 3 is a graph comparing the catalyst loading with sulfur and the sulfur exit level results noted when desulfurizing California premium blend gasoline with MTBE and with hydrogen recycle from a selective oxidizer in the system.

FIG. 3 is a graph which compares the catalyst loading of sulfur and exit levels of sulfur in a vaporized gasoline stream of California special blend gasoline, one of which gasoline streams included a hydrogen ($H_2$) additive, and the other of which included an MTBE additive, but no $H_2$ additive. The solid line trace on the graph indicates the desulfurizer bed catalyst loading with sulfur and exit sulfur level of the fuel stream which was provided with an $H_2$ additive, and the broken line indicates the same data when the gasoline was provided with MTBE. The sulfur loading of the catalyst bed in each instance is also shown in FIG. 3. It will be noted that the sulfur levels at the exit end of the desulfurizing bed 8 in ppm rise faster when MTBE is used than when $H_2$ is used as an additive. It is also noted that the ability of the nickel reactant to absorb sulfur increases when $H_2$ is used as an additive, as compared to MTBE. The amount of hydrogen added was 13 mole percent, the temperature of the tests was 375° F. and the space velocity was two pounds of fuel per hour per pound of reactant. The amount of hydrogen used in this test equaled about 1% of the hydrogen exiting the selective oxidizer, and was added to the gasoline stream by means of a simulated recycle stream from the selective oxidizer. The MTBE was present in an amount of 11% by weight.

Figure 4:
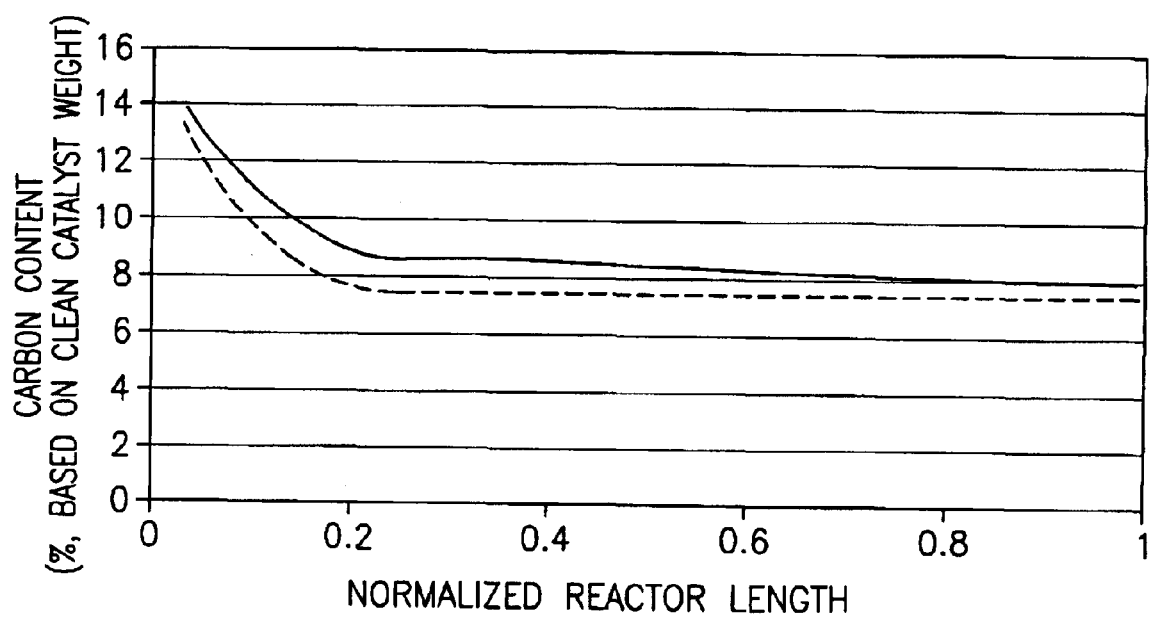
FIG. 4 is graph showing carbon deposition on a nickel reactant bed as a function of the length of the reactant bed.

FIG. 4 is a graph showing carbon deposition on the nickel reactant as a function of the length of the reactant bed shown in percentages of the total reactant bed length. The solid line indicates the extent of carbon deposition from a gasoline fuel which included MTBE but no hydrogen additive. The broken line indicates the extent of carbon deposition from a gasoline which included a hydrogen additive, but no MTBE. It can be seen that when 11% MTBE was added to the gasoline, more carbon was deposited on the nickel reactant bed in two hundred eighteen hours than was deposited on the reactant bed when 13 mole % of hydrogen was added to the gasoline after four hundred fifty hours. The addition of hydrogen to the gasoline being desulfurized enabled the nickel reactant surface to remain available for sulfur reaction for a much longer period of time, thus allowing a much higher sulfur loading on the reactant bed to be achieved.

We conclude that the presence of hydrogen in the gasoline maintains the desulfurization activity of the nickel reactant by significantly suppressing the carbon content (coke deposits and strongly adsorbed species), and by keeping the nickel reactant active sites clean and available for desulfurization of the S-containing organic molecules. It will be readily appreciated that the addition of an effective amount of $H_2$ to a sulfur-containing fuel, will allow the sulfur to be removed from the fuel to the extent necessary for use of the fuel as a hydrogen source for a mobile fuel cell power plant without poisoning the fuel cell power plant reactant beds with sulfur. The sulfur compounds are removed from the fuel by means of a nickel reactant bed through which the fuel flows prior to entering the fuel cell power plant's fuel processing section. The hydrogen serves to control carbon deposition on the nickel reactant bed thereby extending the useful life of the reactant bed and enhancing the sulfur removal capabilities of the nickel reactant bed.

Since many changes and variations of the disclosed embodiment of the invention may be made without departing from the inventive concept, it is not intended to limit the invention otherwise than as required by the appended claims.

What is claimed is:

1. A method for desulfurizing a hydrocarbon fuel stream so as to convert the hydrocarbon fuel stream into a low sulfur content fuel, which low sulfur content fuel is suitable for use in a fuel processing section in a fuel cell power plant, said method comprising the steps of:
   a) providing a nickel reactant desulfurization station which is operative to convert sulfur contained in organic sulfur compounds in the fuel stream to nickel sulfide;
   b) introducing a hydrocarbon fuel stream which contains a molecular hydrogen ($H_2$) additive into said nickel reactant desulfurization station; and
   c) said $H_2$ additive being present in said fuel stream in an amount which is effective to suppress carbon deposition on said nickel reactant and provide an effluent fuel stream at an exit end of said nickel reactant station which effluent fuel stream contains no more than about 0.05 ppm sulfur.

2. The method of claim 1 wherein the $H_2$ additive is derived from a container of $H_2$ in the fuel processing section of the fuel cell power plant.

3. The method of claim 1 wherein said $H_2$ additive is derived from recycled reformed fuel gas from a selective oxidzer in the fuel processing section of the fuel cell power plant.

4. The method of claim 1 wherein said $H_2$ additive is derived from an electrolysis cell in the fuel processing section of the fuel cell power plant which converts water to $H_2$ and $O_2$.

5. A method for desulfurizing a gasoline fuel stream so as to convert the gasoline fuel stream into a low sulfur content fuel, which low sulfur content fuel is suitable for use in a fuel processing section in a fuel cell power plant, said method comprising the steps of:
   a) providing a nickel reactant desulfurization station which is operative to convert sulfur contained in organic sulfur compounds contained in the fuel stream to nickel sulfide;
   b) introducing a gasoline fuel stream which contains a hydrogen ($H_2$) additive into said nickel reactant desulfurization station; and
   c) said $H_2$ additive being present in said gasoline fuel stream in an amount which is effective to provide an effluent gasoline fuel stream at an exit end of said nickel reactant station which effluent gasoline fuel stream contains no more than about 0.05 ppm sulfur.

* * * * *